US009766652B2

(12) United States Patent
Lim et al.

(10) Patent No.: US 9,766,652 B2
(45) Date of Patent: Sep. 19, 2017

(54) CONDUCTIVE STRUCTURE AND METHOD FOR MANUFACTURING SAME

(71) Applicant: LG CHEM, LTD., Seoul (KR)

(72) Inventors: Jin Hyong Lim, Daejeon (KR); Song Ho Jang, Daejeon (KR); Sujin Kim, Daejeon (KR); Ki-Hwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 290 days.

(21) Appl. No.: 14/419,170

(22) PCT Filed: Aug. 30, 2013

(86) PCT No.: PCT/KR2013/007868
§ 371 (c)(1),
(2) Date: Feb. 2, 2015

(87) PCT Pub. No.: WO2014/035207
PCT Pub. Date: Mar. 6, 2014

(65) Prior Publication Data
US 2015/0205326 A1 Jul. 23, 2015

(30) Foreign Application Priority Data

Aug. 31, 2012 (KR) .......................... 10-2012-0096525

(51) Int. Cl.
*G06F 3/045* (2006.01)
*G06F 1/16* (2006.01)
(Continued)

(52) U.S. Cl.
CPC ................ *G06F 1/16* (2013.01); *B32B 15/04* (2013.01); *B32B 15/08* (2013.01); *B32B 15/20* (2013.01);
(Continued)

(58) Field of Classification Search
CPC ..................... G06F 1/16; G06F 3/0412; G06F 2203/04103; B32B 15/04; B32B 27/00;
(Continued)

(56) References Cited

U.S. PATENT DOCUMENTS 7,972,684 B2* 7/2011 Hara ........................ B32B 17/06
428/212
2002/0168478 A1* 11/2002 Kato ........................ C09D 5/24
427/404
(Continued)

FOREIGN PATENT DOCUMENTS

CN 103081026 A 5/2013
JP 2006-344163 A 12/2006
(Continued)

Primary Examiner — Nicholas Lee
Assistant Examiner — Gerald Oliver
(74) *Attorney, Agent, or Firm* — Dentons US LLP

(57) ABSTRACT

The present specification provides a conductive structure body comprising: a substrate; a conductive layer; at least one intermediate layer; and a darkening layer, and a method of manufacturing the same. The conductive structure body may prevent reflectance by the conductive layer without affecting conductivity of the conductive layer, and may improve a concealing property of the conductive layer by improving absorbance. Accordingly, a display panel having improved visibility may be developed by using the conductive structure body.

22 Claims, 11 Drawing Sheets

(51) Int. Cl.

| | |
|---|---|
| *H01B 1/02* | (2006.01) |
| *B32B 15/04* | (2006.01) |
| *B32B 15/08* | (2006.01) |
| *B32B 15/20* | (2006.01) |
| *B32B 27/00* | (2006.01) |
| *B32B 27/06* | (2006.01) |
| *G06F 3/041* | (2006.01) |

(52) U.S. Cl.
 CPC ............. *B32B 27/00* (2013.01); *B32B 27/06* (2013.01); *G06F 3/0412* (2013.01); *H01B 1/026* (2013.01); *B32B 2255/10* (2013.01); *B32B 2255/28* (2013.01); *B32B 2307/202* (2013.01); *B32B 2307/40* (2013.01); *B32B 2307/416* (2013.01); *B32B 2457/20* (2013.01); *B32B 2457/208* (2013.01); *G06F 2203/04103* (2013.01)

(58) Field of Classification Search
 CPC ......... B32B 27/06; B32B 15/08; B32B 15/20; B32B 2255/28; B32B 2255/10; B32B 2307/416; B32B 2457/208; B32B 2307/40; H01B 1/026
 See application file for complete search history.

(56) References Cited

U.S. PATENT DOCUMENTS

| | | |
|---|---|---|
| 2010/0013798 A1 | 1/2010 | Nakajima et al. |
| 2011/0279403 A1 | 11/2011 | Lee et al. |
| 2013/0140065 A1 | 6/2013 | Koo et al. |
| 2013/0215067 A1 | 8/2013 | Hwang et al. |
| 2014/0016278 A1 | 1/2014 | Hwang et al. |
| 2014/0022739 A1 | 1/2014 | Hwang et al. |

FOREIGN PATENT DOCUMENTS

| | | |
|---|---|---|
| JP | 2010-287090 A | 12/2010 |
| KR | 10-2009-0066047 A | 6/2009 |
| KR | 2009-0066047 A | 6/2009 |
| KR | 10-2011-0126528 A | 11/2011 |
| KR | 2011-0126528 A | 11/2011 |
| KR | 10-2012-0040680 A | 4/2012 |
| KR | 2012-0040680 A | 4/2012 |
| KR | 10-2012-0089133 A | 8/2012 |
| KR | 2012-0089133 A | 8/2012 |
| TW | 201233272 A1 | 8/2012 |
| WO | 2012/121519 A2 | 9/2012 |
| WO | 2012/134173 A2 | 10/2012 |
| WO | 2012/134174 A2 | 10/2012 |

\* cited by examiner

[Figure 1]
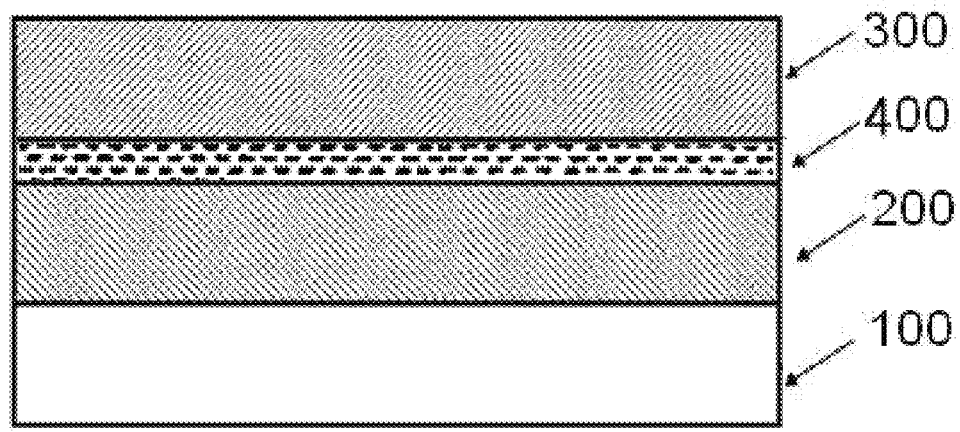
[Figure 2]
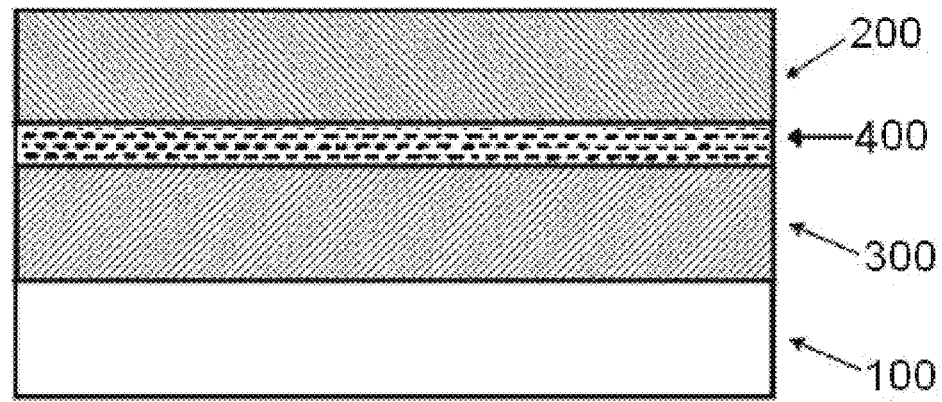

[Figure 3]
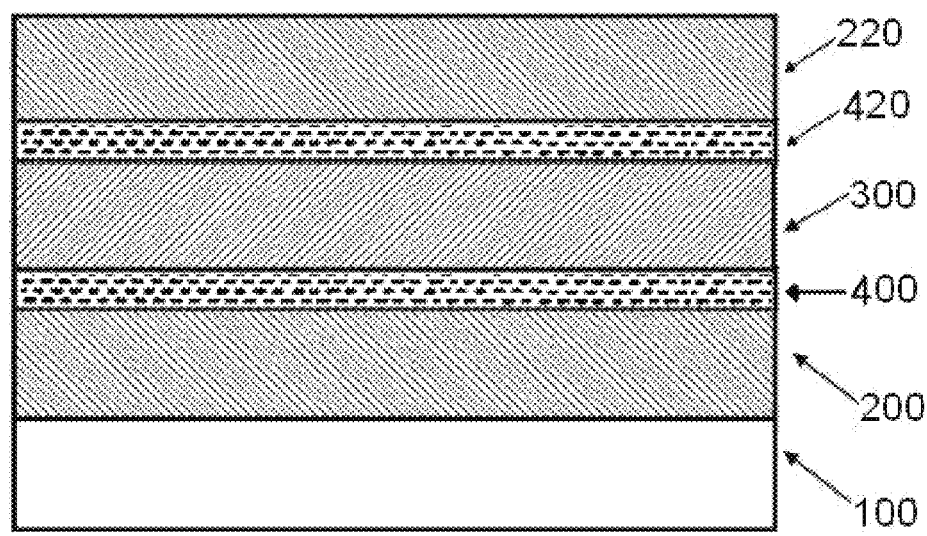

[Figure 4]
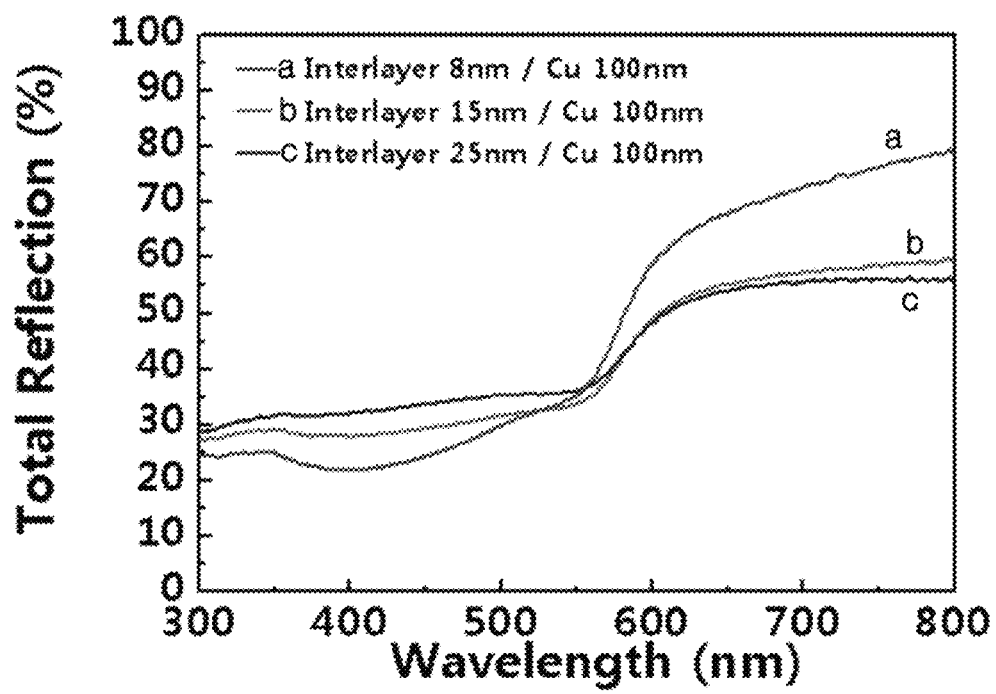

[Figure 5]
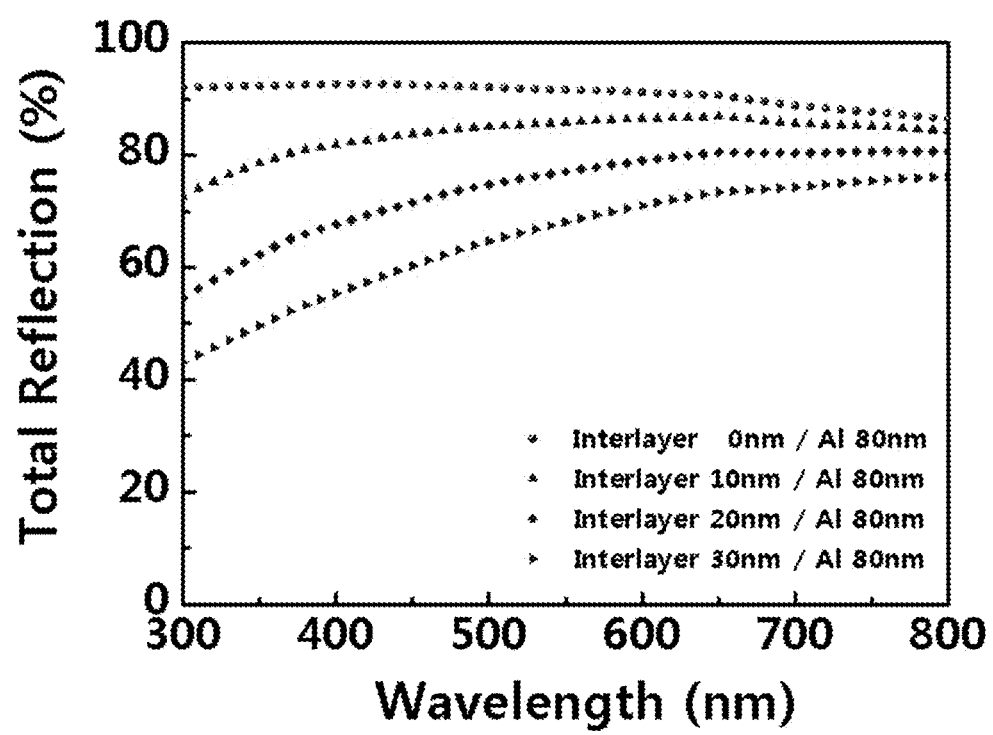

[Figure 6]
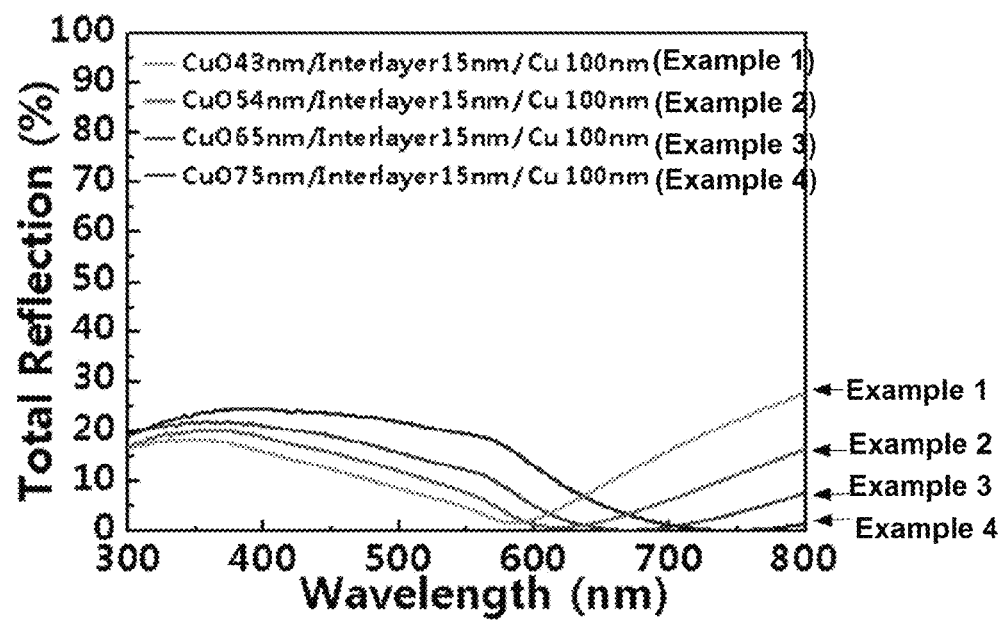

[Figure 7]
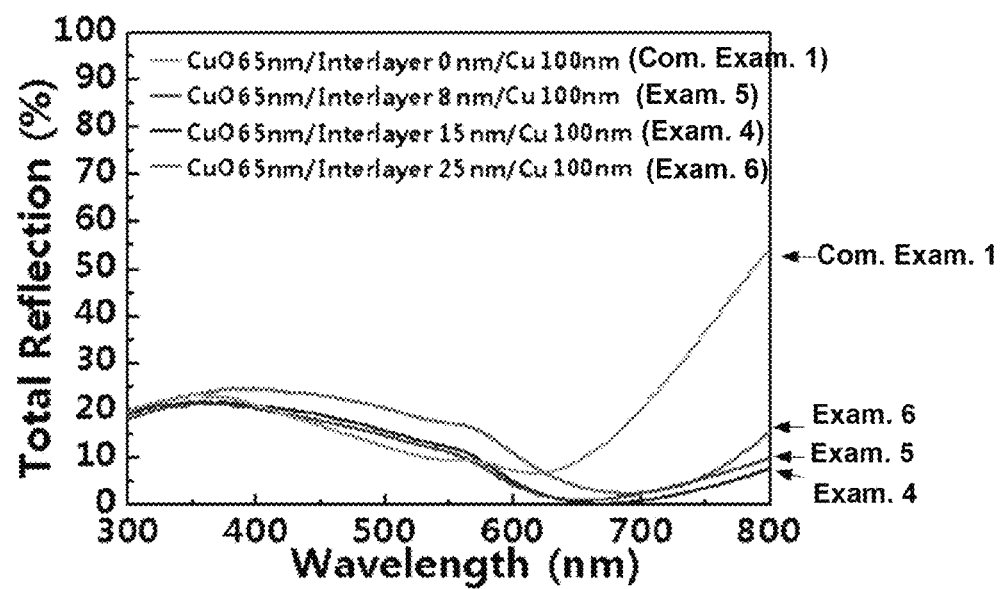

[Figure 8]
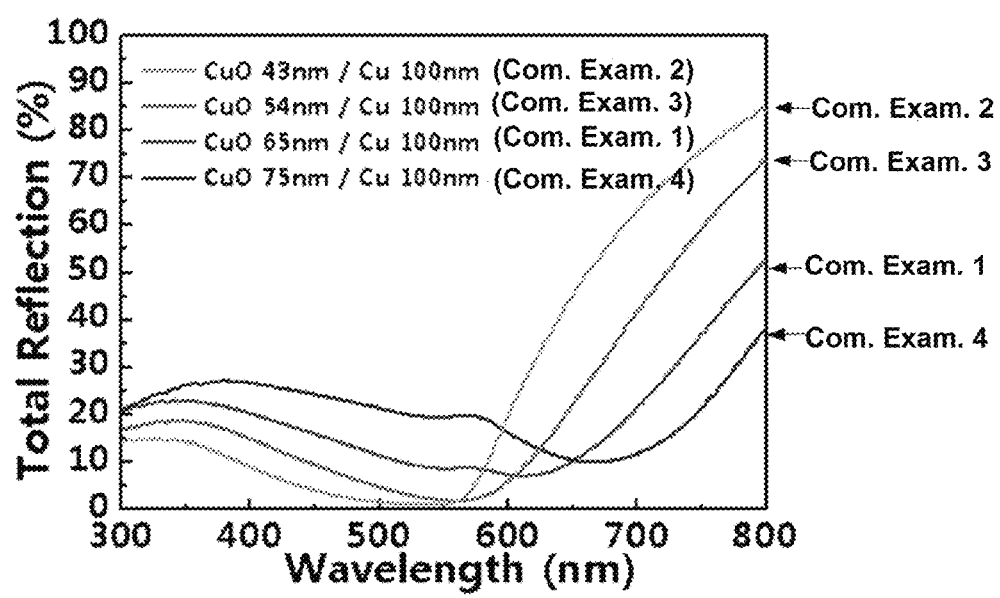

[Figure 9]
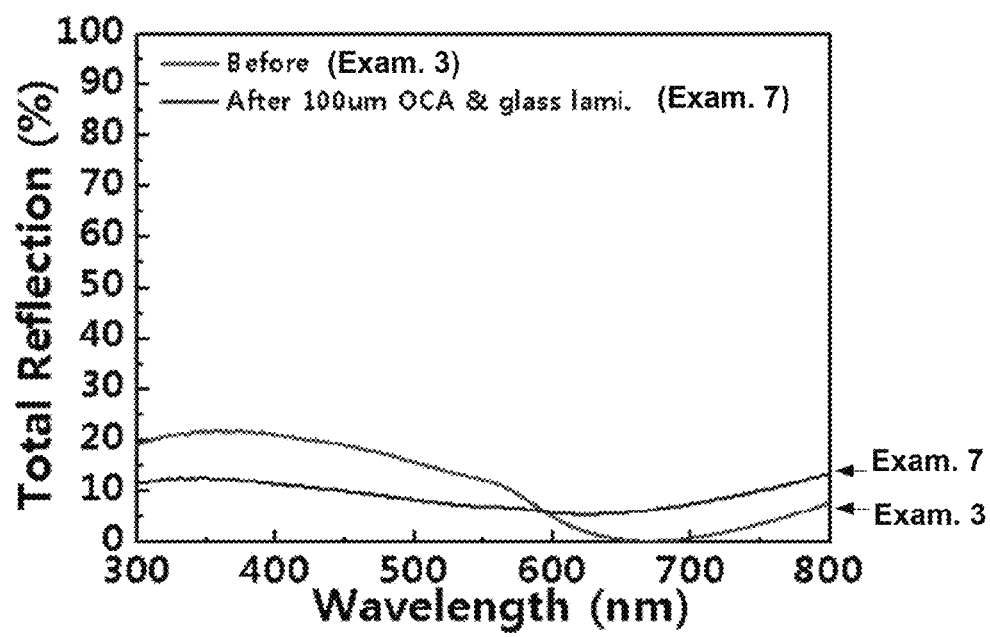

[Figure 10]
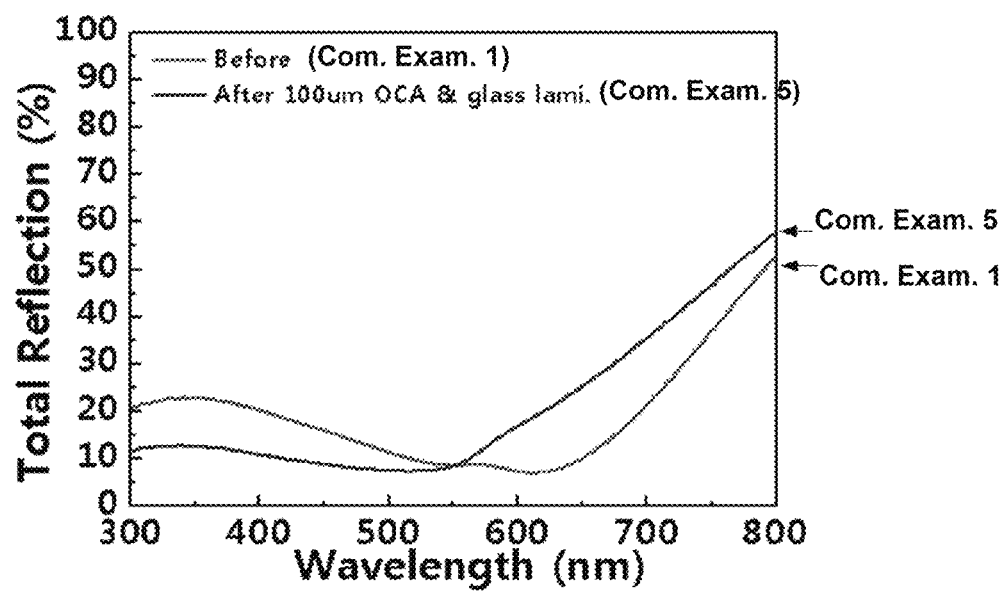

[Figure 11]
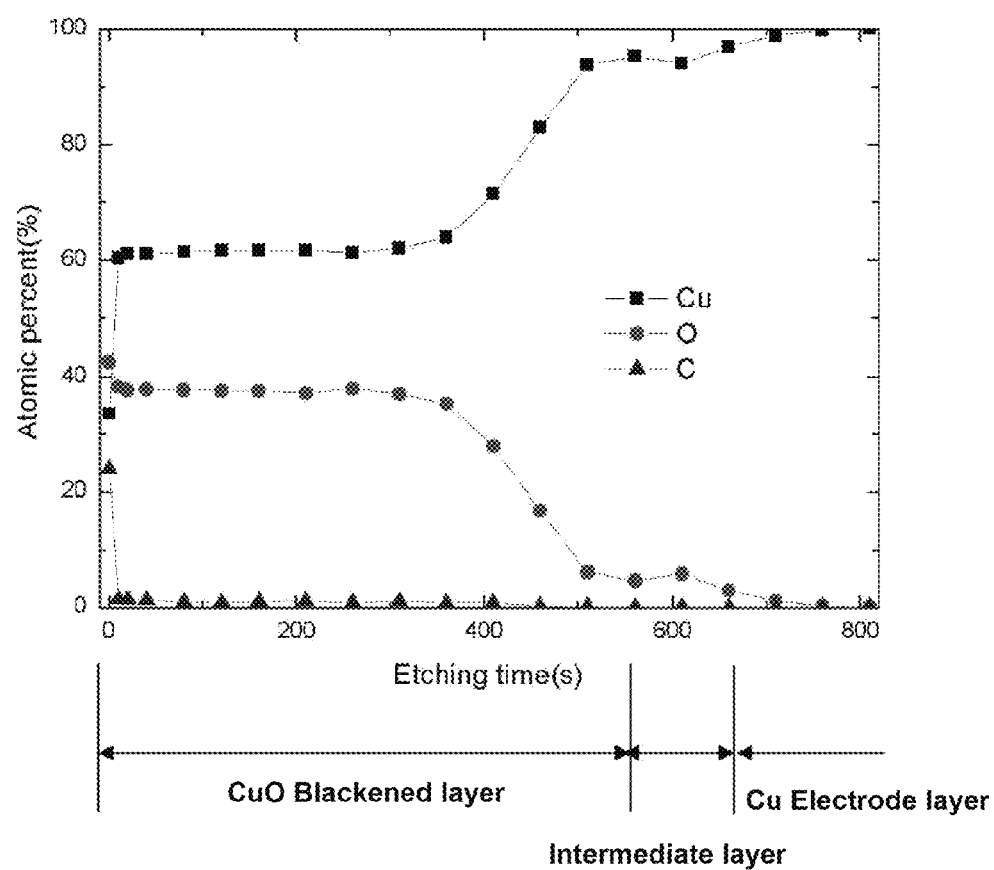

[Figure 12]
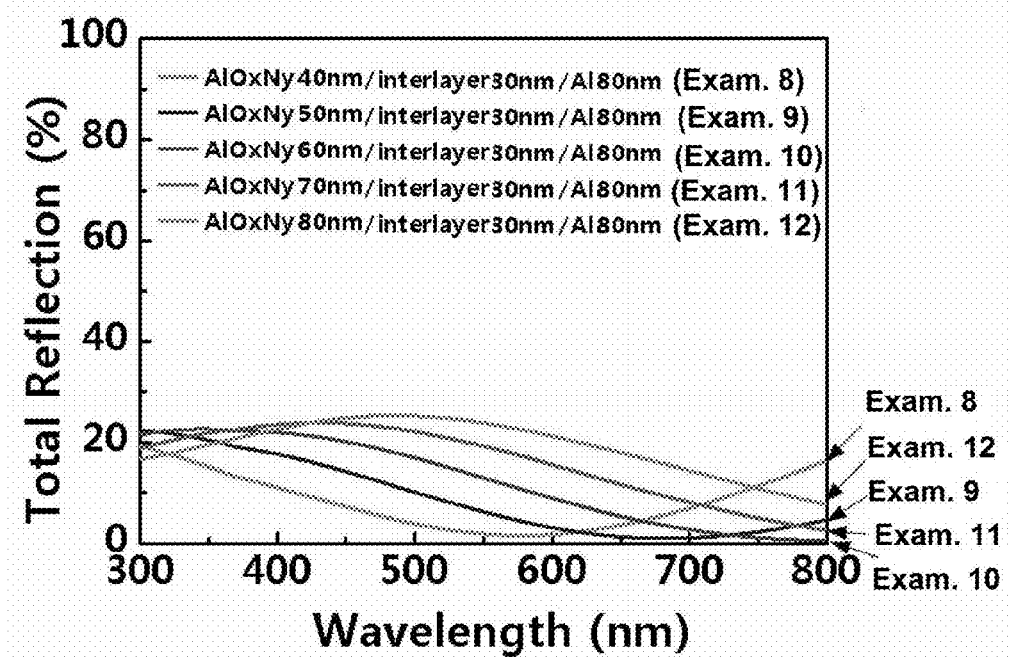

CONDUCTIVE STRUCTURE AND METHOD FOR MANUFACTURING SAME

This application is a 35 USC §371 National Stage entry of International Application No. PCT/KR2013/007868, filed on Aug. 30, 2013, which claims priority of Korean Application No. 10-2012-0096525, filed on Aug. 31, 2012, which is hereby incorporated by reference in its entirety.

TECHNICAL FIELD

The present specification relates to a conductive structure body and a method for manufacturing the same. This application claims priority from Korean Patent Application No. 10-2012-0096525 filed on Aug. 31, 2012, in the KIPO, the disclosure of which is incorporated herein by reference in its entirety.

BACKGROUND ART

In general, a touch screen panel may be classified as follows depending on a detection mode of signals. That is, there are a resistive type sensing a position, which is pressed down by pressure, through a change in current or voltage value while a direct current voltage is applied to the touch screen panel, a capacitive type using capacitance coupling while an alternating current voltage is applied to the touch screen panel, an electromagnetic type sensing a selected position as a change in voltage while a magnetic field is applied to the touch screen panel, and the like.

Recently, as the need for a large-area touch screen panel increases, there is a need for developing a technology that may implement a large touch screen panel having excellent visibility while reducing the resistance of an electrode.

DISCLOSURE

Technical Problem

In the art to which the present invention pertains, there is a need for developing a technology for improving the performance of touch screen panels of the various modes.

Technical Solution

An exemplary embodiment of the present application provides a conductive structure body comprising: a substrate; a conductive layer; at least one intermediate layer; and a darkening layer.

An exemplary embodiment of the present application provides a method for manufacturing a conductive structure body, the method comprising: forming at least one intermediate layer on a conductive layer; forming a darkening layer on the intermediate layer; and laminating the conductive layer or the darkening layer and a substrate.

An exemplary embodiment of the present application provides a method for manufacturing a conductive structure body, the method comprising: forming a conductive layer on a substrate; forming at least one intermediate layer on the conductive layer; and forming a darkening layer on the intermediate layer.

An exemplary embodiment of the present application provides a method for manufacturing a conductive structure body, the method comprising: forming a patterned conductive layer on a substrate; forming at least one patterned intermediate layer on the patterned conductive layer; and forming a patterned darkening layer on the patterned intermediate layer.

Another exemplary embodiment of the present application provides a touch screen panel comprising the conductive structure body.

Another exemplary embodiment of the present application provides a display device comprising the conductive structure body.

Another exemplary embodiment of the present application provides a solar battery comprising the conductive structure body.

Advantageous Effects

The conductive structure body according to the exemplary embodiment of the present application can prevent reflection by a conductive layer without affecting conductivity of the conductive layer, and improve a concealing property of the conductive layer by improving absorbance. In addition, the touch screen panel having improved visibility and the display device and the solar battery comprising the same can be developed by using the conductive structure body according to the exemplary embodiment of the present application.

DESCRIPTION OF DRAWINGS

FIGS. 1 to 3 each are an exemplary embodiment of the present application, and views illustrating a laminate structure of a conductive structure body comprising an intermediate layer and a darkening layer.

FIG. 4 illustrates a reflectance at a visible light region wavelength depending on a thickness of an intermediate layer provided on a conductive layer according to Experimental Example 1.

FIG. 5 illustrates a reflectance at a visible light region wavelength depending on a thickness of an intermediate layer provided on a conductive layer according to Experimental Example 2.

FIG. 6 illustrates the reflectance of Examples 1 to 4 at a visible light region wavelength.

FIG. 7 illustrates the reflectance of Comparative Example 1 and Examples 4, 5 and 6 at a visible light region wavelength.

FIG. 8 illustrates the reflectance of Comparative Examples 1 to 4 at a visible light region wavelength.

FIG. 9 illustrates the reflectance of Examples 3 and 7 at a visible light region wavelength.

FIG. 10 illustrates the reflectance of Comparative Examples 1 and 5 at a visible light region wavelength.

FIG. 11 illustrates an atomic percent reflectance according to a Cu darkening layer as a darkening layer, an intermediate layer and a Cu electrode layer as a conductive layer according to Experimental Example 3.

FIG. 12 illustrates the reflectance of Examples 8 to 12 at a visible light region wavelength.

MODE FOR INVENTION

Hereinafter, the present application will be described in more detail.

In the present specification, a display device refers to all monitors for a TV or a computer, and comprises a display element forming an image and a case supporting the display element.

Examples of the display element may comprise a plasma display panel (PDP), a liquid crystal display (LCD), an electrophoretic display, a cathode-ray tube (CRT), an OLED display, and the like. An RGB pixel pattern for implementing an image and an additional optical filter may be provided in the display element.

Meanwhile, in connection with a display device, as the spread of smart phones, tablet PCs, and IPTVs is accelerated, a demand for a touch function that uses human hands as a direct input device without a separate input device such as keyboards or remote controllers is growing. In addition, a multi-touch function for recognizing a specific point and taking notes is also required.

Currently, most commercially available touch screen panels (TSP) are based on a transparent conductive ITO thin film, but have problems in that a touch recognition speed is decreased and an additional compensation chip for overcoming the decrease of the touch recognition speed should be introduced because of a RC delay due to relatively high surface resistance of the ITO transparent electrode (minimum 150 Ω/square, ELECRYSTA products manufactured by Nitto Denko Co., Ltd.) when a touch screen panel having a large area is applied.

The inventors of the present application have studied a technology for replacing the transparent ITO thin film by a metal fine pattern. In this regard, the inventors of the present application found that in the case where Ag, Mo/Al/Mo, MoTi/Cu, and the like, which are metal thin films having high electric conductivity, are used as an electrode of a touch screen panel, when a fine electrode pattern having a predetermined shape is to be implemented, there is a problem in that the pattern is easily recognized by the human eye in view of visibility due to high reflectance, and glaring and the like may occur due to high reflectance and haze value to external light. In addition, the present inventors found that a costly target is used during the manufacturing process or there are many cases where the process is complicated.

Accordingly, an exemplary embodiment of the present application provides a conductive structure body that may be applied to a touch screen panel that may be differentiated from a known touch screen panel using an ITO-based transparent conductive thin film layer and has an improved concealing property of a metal fine pattern electrode and improved reflection and diffraction properties to external light.

A conductive structure body according to an exemplary embodiment of the present application comprises: a substrate; a conductive layer; at least one intermediate layer; and a darkening layer. Here, the darkening layer may be provided only on any one surface of the conductive layer, or both surfaces of the conductive layer.

In the present specification, a darkening layer may be a patterned darkening layer or a darkened pattern layer. Further, in the present specification, a conductive layer may be a patterned conductive layer or a conductive pattern layer. In addition, in the present specification, an intermediate layer may be a patterned intermediate layer.

A conductive structure body according to an exemplary embodiment of the present application comprises at least one intermediate layer between a conductive layer and a darkening layer. The intermediate layer may have one layer, or two or more layers. The intermediate layer serves to primarily lower a reflectance of a conductive layer. Thus, there is an effect that allows a final conductive structure body to have an excellent reflectance of 20% or less, 15% or less, and 10% or less evenly in the entire wavelength region. In a conductive structure body in which an intermediate layer is not comprised, a reflectance of 20% or more may be measured in a visible light wavelength region of 600 nm or more. By comprising an intermediate layer, there is an effect that may lower the reflectance by 70% or more in a visible light wavelength region of 600 nm or more, compared to the case where the intermediate layer is not comprised. Furthermore, a conductive structure body comprising an intermediate layer may also allow a reflectance of a conductive layer to be primarily lowered in a visible light wavelength region of 500 nm or less.

In an exemplary embodiment of the present application, the conductive layer may be provided between a substrate and a darkening layer, and the at least one intermediate layer may be provided between the conductive layer and the darkening layer.

In an exemplary embodiment of the present application, the darkening layer may be provided between a substrate and a conductive layer, and the at least one intermediate layer may be provided between the conductive layer and the darkening layer.

A conductive structure body according to an exemplary embodiment of the present application may comprise: a substrate; a conductive layer provided on the substrate; at least one intermediate layer provided on the conductive layer; and a darkening layer provided on the intermediate layer.

A conductive structure body according to an exemplary embodiment of the present application may comprise: a substrate; a darkening layer provided on the substrate; at least one intermediate layer provided on the darkening layer; and a conductive layer provided on the darkening layer.

A conductive structure body according to an exemplary embodiment of the present application may comprise: a substrate; a darkening layer provided on the substrate; at least one intermediate layer provided on the darkening layer; a conductive layer provided on the intermediate layer; at least one intermediate layer provided on the conductive layer; and a darkening layer provided on the intermediate layer.

In an exemplary embodiment of the present application, the conductive layer, the intermediate layer, or the darkening layer may be patterned. The conductive layer may be a patterned conductive layer, the darkening layer may be a patterned darkening layer, and the intermediate layer may be a patterned intermediate layer. A form of the pattern will be described below.

The inventors of the present application found the fact that light reflection and diffraction properties by the patterned layers significantly affect visibility of the conductive metal fine pattern in a touch screen panel comprising the conductive metal fine pattern provided in an effective screen portion, and attempted to improve this. Specifically, a problem caused by the reflectance of the conductive pattern due to high transmittance of the ITO was not serious in a known ITO-based touch screen panel, but it was found that reflectance and darkening properties of the conductive metal fine pattern were important in the touch screen panel comprising the conductive metal fine pattern provided in the effective screen portion.

The darkening layer may be introduced in order to decrease the reflectance of the conductive metal fine pattern and improve the absorbance property in the touch screen panel according to the exemplary embodiment of the present application. The darkening layer may be provided on at least one surface of the conductive layer in the touch screen panel to largely prevent a decrease in visibility according to high reflectance of the conductive layer.

Specifically, since the darkening layer has light absorptivity, the reflectance by the conductive layer may be decreased by decreasing the quantity of light that is incident on the conductive layer and the quantity of light that is reflected from the conductive layer. In addition, the darkening layer may have low reflectance as compared to that of the conductive layer. Thereby, the reflectance of light may be decreased as compared to the case where the user directly observes the conductive layer, and thus visibility of the conductive layer may be largely improved.

In the present specification, the darkening layer means a layer having absorbance to reduce the quantity of light that is incident on the conductive layer itself and the quantity of light that is reflected from the conductive layer, may be the patterned darkening layer, and may be represented by terms such as an absorbance layer, a blackened layer, and a blackening layer, and the patterned darkening layer may be represented by terms such as a patterned absorbance layer, a patterned blackened layer, and a patterned blackening layer.

In the exemplary embodiment of the present application, the conductive structure body comprising the patterned conductive layer and the patterned darkening layer may have surface resistance of 1 Ω/square or more and 300 Ω/square or less, specifically 1 Ω/square or more and 100 Ω/square or less, more specifically 1 Ω/square or more and 50 Ω/square or less, and even more specifically 1 Ω/square or more and 20 Ω/square or less.

If the surface resistance of the conductive structure body is 1 Ω/square or more and 300 Ω/square or less, there is an effect of replacing a known ITO transparent electrode. In the case where the surface resistance of the conductive structure body is 1 Ω/square or more and 100 Ω/square or less or 1 Ω/square or more and 50 Ω/square or less, and particularly, in the case where the surface resistance is 1 Ω/square or more and 20 Ω/square or less, since the surface resistance is significantly low as compared to the case where the known ITO transparent electrode is used, there are advantages in that a RC delay is reduced when a signal is applied to significantly improve a touch recognition speed, and accordingly, a touch screen having a large area of 10 inches or more may be easily applied.

In the conductive structure body, the surface resistance of the conductive layer or the darkening layer before patterning may be more than 0 Ω/square and 10 Ω/square or less, more than 0 Ω/square and 2 Ω/square or less, and specifically, more than 0 Ω/square and 0.7 Ω/square or less. If the surface resistance is 2 Ω/square or less, and particularly 0.7 Ω/square or less, designing of fine patterning and a manufacturing process are easily performed as the surface resistance of the conductive layer or the darkening layer before patterning is decreased, and there is an effect that a response speed of the electrode is increased by decreasing the surface resistance of the conductive structure body after patterning. The surface resistance may be adjusted according to the thickness of the conductive layer or the darkening layer.

In the conductive structure body, a sheet resistance measured on the surface of the intermediate layer before patterning may be more than 0Ω/□ and 10Ω/□ or less, specifically more than 0Ω/□ and 5Ω/□ or less, and more specifically more than 0Ω/□ and 1Ω/□ or less. That is, there is no change in sheet resistance even when an intermediate layer is provided on one surface of the conductive layer. Referring to Table 1 in the following Experimental Example 1, it can be confirmed that there is no loss in sheet resistance of an electrode as a conductive layer because there is almost no change between a sheet resistance of the conductive layer and a sheet resistance when an intermediate layer is provided at an upper portion of the conductive layer.

In the conductive structure body according to the exemplary embodiment of the present application, the extinction coefficient k of the darkening layer may be 0.2 to 2.5, specifically 0.2 to 1.2, and more specifically 0.4 to 1.

If the extinction coefficient k is 0.2 or more, there is an effect facilitating darkening. The extinction coefficient k may be called an absorption coefficient, and is an index defining how strong the conductive structure body absorbs light at a predetermined wavelength and a factor determining transmittance of the conductive structure body. For example, in the case of a transparent dielectric material, k<0.2, which is very low. However, as the amount of metal components in the material is increased, the k value is increased. If the amount of metal components is more increased, transmission hardly occurs, mostly, only surface reflection occurs on the metal, and the extinction coefficient k is more than 2.5, which is not preferable in formation of the darkening layer.

When an extinction coefficient is 0.4 to 1, there is an effect in that the reflectance is further decreased, and thus the degree of darkening of the darkening layer is further increased. In this case, a concealing property of the conductive layer may be further enhanced, and visibility may be further improved when the conductive layer is applied to a touch screen panel.

In an exemplary embodiment of the present application, a refractive index n of the conductive structure body may be more than 0 to 3 or less.

In the description of the following reflectance, the darkening layer may be a patterned darkening layer, the conductive layer may be a patterned conductive layer, and the intermediate layer may be a patterned intermediate layer.

A conductive structure body according to an exemplary embodiment of the present application may have a total reflectance of 20% or less, specifically 15% or less, more specifically 10% or less, even more specifically 7% or less, or 3% or less. The smaller the total reflectance is, the better the effect is.

In an exemplary embodiment of the present application, the total reflectance may mean a reflectance to light having a wavelength from 300 nm to 800 nm, and specifically from 380 nm to 780 nm, which is incident at 90 degrees to a surface desired to be measured, after a surface opposite to the surface desired to be measured is treated with a black layer (perfect black).

When an intermediate layer is not comprised in the conductive structure body according to an exemplary embodiment of the present application, the total reflectance in a visible light region of 600 nm or less may be 20% or less, but the total reflectance measured in a visible light region of 600 nm or more may be 20% or more. However, a conductive structure body comprising an intermediate layer may have a total reflectance of 20% or less, specifically 15% or less, more specifically 10% or less, even more specifically 7% or less, and 3% or less, in the entire region of visible light from 300 nm to 800 nm.

When a conductive layer is provided between a substrate and a darkening layer, and an intermediate layer is provided between the conductive layer and the darkening layer, the reflectance may be measured in a direction of a surface opposite to a surface on which the darkening layer is in contact with the intermediate layer. Specifically, when the darkening layer comprises a first surface that is in contact with the intermediate layer and a second surface facing the first surface, the reflectance may be measured in a direction of the second surface. When the reflectance is measured in this direction, the total reflectance may be 20% or less, specifically 15% or less, more specifically 10% or less, even more specifically 7% or less, and 3% or less. The smaller the total reflectance is, the better the effect is.

Further, when the darkening layer is provided between the conductive layer and the substrate, and the intermediate layer is provided between the conductive layer and the darkening layer, the reflectance may be measured at the substrate side. When the total reflectance is measured at the substrate side, the total reflectance may be 20% or less, specifically 15% or less, more specifically 10% or less, even more specifically 7% or less, and 3% or less. The smaller the total reflectance is, the better the effect is.

In the present specification, when incident light is 100%, total reflectance may be a value measured based on the wavelength value of 300 nm to 800 nm, specifically 380 nm to 780 nm of light reflected by a target pattern layer or the conductive structure body on which light is incident.

In the conductive structure body according to the exemplary embodiment of the present application, the darkening layer may comprise a first surface that is in contact with the conductive layer and a second surface facing the first surface. In this case, when the total reflectance of the conductive structure body is measured at a side of the second surface of the darkening layer, the reflectance (Rt) of the conductive structure body may be calculated by the following Equation 1.

Total Reflectance($Rt$)=reflectance of the substrate+
closure ratio×reflectance of the darkening layer    [Equation 1]

In addition, in the case where the conductive structure body has a constitution in which two kinds of conductive structure bodies are laminated, the reflectance (Rt) of the conductive structure body may be calculated by the following Equation 2.

Total Reflectance($Rt$)=reflectance of the substrate+
closure ratio×reflectance of the darkening
layer×2    [Equation 2]

In Equations 1 and 2, the total reflectance of the substrate may be reflectance of a touch reinforced glass, and in the case where the surface is a film, the reflectance of the substrate may be reflectance of the film.

In addition, the closure ratio may be represented by an area ratio of a region covered by the conductive pattern, that is, (1−opening ratio), based on a plane of the conductive structure body.

Accordingly, a difference between the case where there is the patterned darkening layer and the case where there is no patterned darkening layer depends on the reflectance of the patterned darkening layer. In this regard, the total reflectance (Rt) of the conductive structure body according to the exemplary embodiment of the present application may be decreased by 10 to 20%, 20 to 30%, 30 to 40%, 40 to 50%, or 50 to 70% as compared to the total reflectance ($R_O$) of the conductive structure body having the same constitution, except that there is no patterned darkening layer. That is, in the case where in Equations 1 and 2, the closure ratio range is changed from 1 to 10% and the reflectance range is changed within a range of from 1 to 30%, the maximum reflectance decrease effect of 70% may be exhibited, and the minimum reflectance decrease effect of 10% may be exhibited.

In the conductive structure body according to the exemplary embodiment of the present application, the patterned darkening layer comprises a first surface that is in contact with the conductive pattern and a second surface facing the first surface, and when the total reflectance of the conductive structure body is measured at a side of the second surface of the darkening pattern, a difference between the total reflectance (Rt) of the conductive structure body and the reflectance ($R_O$) of the substrate may be 40% or less, 30% or less, 20% or less, or 10% or less.

In an exemplary embodiment of the present invention, the conductive structure body may have a lightness value (L*) of 50 or less, and more specifically 40 or less based on the CIE (Commission Internationale de l'Eclairage) L*a*b* color coordinate. The reflectance is decreased as the lightness value is decreased to provide an advantageous effect.

In the exemplary embodiment of the present application, a pin hole may be hardly present in the conductive structure body, and even though the pin hole is present, a diameter thereof may be 3 μm or less, and more specifically 1 μm or less. In the case where the diameter of the pin hole in the conductive structure body is 3 μm or less, occurrence of a short circuit may be prevented. Further, in the case where the pin holes are hardly present in the conductive structure body and the number thereof is very small, occurrence of the short circuit may be prevented.

In the exemplary embodiment of the present application, the darkening layer may be provided on at least one surface of the conductive layer. Specifically, the darkening layer may be provided on only any one surface of the conductive layer, or both surfaces thereof.

In the exemplary embodiment of the present application, the darkening layer, intermediate layer and the conductive layer may be simultaneously or separately patterned.

In the exemplary embodiment of the present application, the patterned intermediate layer, the patterned darkening layer and the patterned conductive layer may form a laminate structure by a simultaneous or separate patterning process. In this regard, the laminate structure may be differentiated from a structure where at least a portion of a light absorption material is incorporated or dispersed in the conductive pattern, or a structure where a portion at a surface side of the conductive pattern of the single layer is physically or chemically modified by an additional surface treatment.

In addition, in the conductive structure body according to an exemplary embodiment of the present application, the darkening layer may be directly provided on the substrate or on the conductive layer with an intermediate layer therebetween without interposing an attachment layer or an adhesive layer. The attachment layer or adhesive layer may affect durability or optical properties. In addition, a method for manufacturing the conductive structure body according to the exemplary embodiment of the present application is significantly different from that of the case where the attachment layer or adhesive layer is used. Moreover, in the exemplary embodiment of the present application, an interface property between the substrate or conductive layer and the darkening layer is excellent as compared to the case where the attachment layer or adhesive layer is used.

In the exemplary embodiment of the present application, the darkening layer may be formed of a single layer, or a plurality of layers of two or more layers.

In the exemplary embodiment of the present application, it is preferable that the darkening layer have an achromatic color. In this case, the achromatic color means a color exhibited when light that is incident on a surface of a body is not selectively absorbed but reflected and absorbed uniformly to a wavelength of each component.

In the exemplary embodiment of the present application, the material of the darkening layer may be used without a particular limitation. For example, in a color filter, materials used as a material of a black matrix may be used. Further, a material having an antireflection function may be used.

For example, the darkening layer may comprise one or two or more selected from the group consisting of metal, oxides thereof, nitrides thereof, oxynitrides thereof, and carbides thereof. Oxides, nitrides, oxynitrides, or carbides of the metal may be formed by a deposition condition set by the person with ordinary skill in the art and the like. The metal may be one or two or more selected from the group consisting of nickel (Ni), vanadium (V), tungsten (W), tantalum (Ta), molybdenum (Mo), niobium (Nb), titanium (Ti), iron (Fe), chrome (Cr), cobalt (Co), aluminum (Al), and copper (Cu). Specifically, the darkening layer may comprise oxides of copper, nitrides of copper, oxynitrides of copper, oxides of aluminum, nitrides of aluminum, or oxynitrides of aluminum.

For example, the intermediate layer may comprise one or two or more selected from the group consisting of metal, oxides thereof, nitrides thereof, oxynitrides thereof, and carbides thereof. Oxides, nitrides, oxynitrides, or carbides of the metal may be formed by a deposition condition set by the person with ordinary skill in the art and the like. The metal may be one or two or more selected from the group consisting of nickel (Ni), vanadium (V), tungsten (W), tantalum (Ta), molybdenum (Mo), niobium (Nb), titanium (Ti), iron (Fe), chrome (Cr), cobalt (Co), aluminum (Al), and copper (Cu). Specifically, the intermediate layer may comprise oxides of copper, nitrides of copper, oxynitrides of copper, oxides of aluminum, nitrides of aluminum, or oxynitrides of aluminum.

As another specific example thereof, the intermediate layer or the darkening layer may comprise at least one of the dielectric material and metal. The aforementioned metal may be metal or a metal alloy. Specifically, the darkening layer may further comprise the dielectric material selected from $TiO_{2-x}$, $SiO_{2-x}$, $MgF_{2-x}$ and $SiN_{1.3-x}$ ($-1 \leq x \leq 1$), and metal selected from iron (Fe), cobalt (Co), titanium (Ti), vanadium (V), aluminum (Al), molybdenum (Mo), copper (Cu), gold (Au), and silver (Ag), and further comprise an alloy of two or more metals selected from iron (Fe), cobalt (Co), titanium (Ti), vanadium (V), aluminum (Al), molybdenum (Mo), copper (Cu), gold (Au), and silver (Ag).

According to the exemplary embodiment of the present application, the intermediate layer or the darkening layer may comprise one or two or more selected from the group consisting of oxides of metal, nitrides of metal, oxynitrides of metal, and carbides of metal, and may further comprise at least one of the dielectric material and the metal.

It is preferable that the dielectric material is distributed in an amount gradually decreased as external light goes away in an incident direction, and the metal and alloy component are distributed on the contrary. In this case, it is preferable that the content of the dielectric material is 20 wt % to 50 wt % and the content of the metal is 50 wt % to 80 wt %. In the case where the darkening layer further comprises the alloy, it is preferable that the darkening layer comprises 10 wt % to 30 wt % of the dielectric material, 50 wt % to 80 wt % of the metal, and 5 wt % to 40 wt % of the alloy.

As another specific example thereof, the intermediate layer or the darkening layer may be formed of a thin film comprising an alloy of nickel and vanadium and one or more of oxide, nitride, and oxynitride of nickel and vanadium. In this case, it is preferable that vanadium is comprised in a content of 26 atom % to 52 atom %, and it is preferable that an atomic ratio of vanadium to nickel is 26/74 to 52/48.

As another specific example thereof, the intermediate layer or the darkening layer may comprise a transition layer in which two or more elements are comprised and a composition ratio of one element is increased by about maximum 20% per 100 angstrom according to an incident direction of external light. In this case, one element may be a metal element such as nickel (Ni), vanadium (V), tungsten (W), tantalum (Ta), molybdenum (Mo), niobium (Nb), titanium (Ti), iron (Fe), chrome (Cr), cobalt (Co), aluminum (Al), and copper (Cu), and the element other than the metal element may be oxygen, nitrogen, or carbon.

As another specific example thereof, the intermediate layer or the darkening layer may comprise a first chrome oxide layer, a metal layer, a second chrome oxide layer, and a chrome mirror, and in this case, may comprise metal selected from nickel (Ni), vanadium (V), tungsten (W), tantalum (Ta), molybdenum (Mo), niobium (Nb) titanium (Ti), iron (Fe), cobalt (Co), aluminum (Al), and copper (Cu) instead of chrome. It is preferable that the metal layer has a thickness of 10 nm to 30 nm, the first chrome oxide layer has a thickness of 35 nm to 41 nm, and the second chrome oxide layer has a thickness of 37 nm to 42 nm.

As another specific example thereof, as the intermediate layer or the darkening layer, a laminate structure of an alumina ($Al_2O_3$) layer, a chrome oxide ($Cr_2O_3$) layer, and a chrome (Cr) layer may be used. Herein, the alumina layer has an improved reflection property and a light diffusion prevention property, and the chrome oxide layer may improve a contrast property by decreasing inclined surface reflectance.

In an exemplary embodiment of the present application, when the atomic percent of a metal in the total composition of the intermediate layer is larger than that of the metal in the total composition of the darkening layer, specifically more than one time and two times or less, an effect of primarily lowering a reflectance with respect to the conductive layer is the best, and an effect of primarily lowering a reflectance in a visible light wavelength region of 600 nm or more is particularly excellent. Thus, there is an effect that allows a reflectance of a conductive structure body comprising a conductive layer, an intermediate layer, and a darkening layer to be lowered evenly to 20% or less in the entire wavelength region of visible light from 300 nm to 800 nm.

In the exemplary embodiment of the present application, the material of the conductive layer is appropriately a material having specific resistance of $1 \times 10^{-6}$ Ω·cm to $30 \times 10^{-6}$ Ω·cm and preferably $1 \times 10^{-6}$ Ω·cm to $7 \times 10^{-6}$ Ω·cm.

In the conductive structure body according to the exemplary embodiment of the present application, it is preferable that the material of the conductive layer comprise one or two or more selected from the group consisting of metal, a metal alloy, metal oxides, and metal nitrides. It is preferable that the material of the conductive layer be a metal material that has excellent electric conductivity and is easily etched. However, in general, the material having excellent electric conductivity has a disadvantage in that reflectance is high. However, in the present application, it is possible to form the conductive layer using the material having high reflectance by using the darkening layer. In the present application, in the case where the material having reflectance of 70% to 80% or more is used, the darkening layer may be added to decrease the reflectance, improve a concealing property of the conductive layer, and maintain or improve a contrast property.

In the exemplary embodiment of the present application, specific examples of the material of the conductive layer may comprise one or two or more selected from the group consisting of copper (Cu), aluminum (Al), silver (Ag), neodymium (Nd), molybdenum (Mo), nickel (Ni), oxides thereof, and nitrides thereof. For example, the material may be an alloy of two or more selected from the aforementioned metals. More specifically, molybdenum, aluminum, or copper may be comprised. The conductive layer may be a single film or a multilayered film.

In an exemplary embodiment of the present application, the conductive layer, the intermediate layer, and the darkening layer may comprise the same metal. When the same metal is comprised, there is an advantage in process because a process work may be performed using the same etchant, and there is an advantageous effect in the manufacturing process due to an advantage even in terms of a production rate.

In an exemplary embodiment of the present application, when the intermediate layer has two or more layers, a substrate, a conductive layer, a first intermediate layer, a second intermediate layer, and a darkening layer may be provided in this order, or a conductive layer, a first intermediate layer, a second intermediate layer, a darkening layer, and a substrate may be provided in this order. In this case, the ratio of a metal in the first intermediate layer which is adjacent to the conductive layer may be larger than that of the metal in the second intermediate layer which is adjacent to the darkening layer.

In an exemplary embodiment of the present application, the intermediate layer may be comprised while the ratio of the metal has a gradient in a thickness direction. In this case, the gradient may be formed such that the ratio of the metal is increased as the intermediate layer is adjacent to the darkening layer, and the ratio of the metal is decreased as the intermediate layer is adjacent to the conductive layer. On the contrary, the ratio of the metal may be increased as the intermediate layer is adjacent to the conductive layer, and the ratio of the metal may be decreased as the intermediate layer is adjacent to the darkening layer.

Further, even when the intermediate layer has two or more layers, the intermediate layer may be comprised while the ratio of the metal has a gradient in a thickness direction. In this case, it is possible to form a gradient in which the ratio of the metal in the first intermediate layer which is adjacent to the conductive layer is increased as the intermediate layer is adjacent to the conductive layer, and the ratio of the metal in the first intermediate layer which is adjacent to the conductive layer is decreased as the intermediate layer is adjacent to the darkening layer, and it is possible to form a gradient in which the ratio of the metal in the second intermediate layer which is adjacent to the darkening layer is also increased as the intermediate layer is adjacent to the conductive layer, and the ratio of the metal in the second intermediate layer which is adjacent to the darkening layer is decreased as the intermediate layer is adjacent to the darkening layer. Furthermore, the ratio of the metal in the first intermediate layer which is adjacent to the conductive layer may be larger than that of the metal in the second intermediate layer which is adjacent to the darkening layer.

In an exemplary embodiment of the present application, the conductive layer may comprise copper, and the intermediate layer and the darkening layer may comprise oxides of copper, nitrides of copper, or oxynitrides of copper.

In a conductive structure body according to an exemplary embodiment of the present application, the conductive layer may comprise copper, the intermediate layer and the darkening layer may comprise oxides of copper, and the atomic percent of copper in the total composition of the intermediate layer may be 1.01 times to 1.62 times that of copper in the total composition of the darkening layer. More specifically, the conductive layer may comprise copper, the intermediate layer may comprise an oxide of copper in which an atomic percent ratio of copper:oxygen is 95:5 to 97:3, and the darkening layer may comprise an oxide of copper in which an atomic percent ratio of copper:oxygen is 60:39 to 94:6. When the intermediate layer and the darkening layer are all formed of an copper oxide, an effect of primarily lowering a reflectance with respect to the conductive layer is the best while having an atomic percent ratio in the range, and an effect of primarily lowering a reflectance in a visible light wavelength region of 600 nm or more is particularly excellent. Thus, there is an effect that allows a reflectance of a conductive structure body comprising a conductive layer, an intermediate layer, and a darkening layer to be lowered evenly to 20% or less in the entire wavelength region of visible light from 300 nm to 800 nm.

In a conductive structure body according to an exemplary embodiment of the present application, when a conductive layer comprises copper and an intermediate layer and a darkening layer comprises an oxide of copper, the intermediate layer may have a gradient in which an atomic percent ratio of copper is decreased as the intermediate layer is adjacent to the darkening layer in a thickness direction, and an average atomic percent ratio of copper:oxygen in the intermediate layer may be 95:5 to 97:3. In this case, the range of the gradient may be present in a range from a ratio of copper in the conductive layer to a ratio of copper in the darkening layer.

In an exemplary embodiment of the present application, the conductive layer may comprise aluminum, and the intermediate layer and the darkening layer may comprise oxides of aluminum, nitrides of aluminum, or oxynitrides of aluminum. Specifically, the conductive layer may comprise aluminum, the intermediate layer may comprise oxynitrides of aluminum in which an atomic percent of nitrogen in the total composition is more than 0% and less than 20%, and the darkening layer may comprise oxynitrides of aluminum in which an atomic percent of nitrogen in the total composition is 20% or more and 45% or less.

For example, when the conductive layer comprises copper, in the case where the intermediate layer and the darkening layer comprise a copper oxide which is $CuO_x$ (x is a ratio of the number of atoms of O to one atom of Cu, 0<x), a bulk etching may be performed, and thus there is an economic advantage in that the efficiency is high in the production process, and the costs are saved. Further, copper has a specific resistance value of $1.7 \times 10^{-6}$ $\Omega \cdot cm$, which is advantageous over Al having a specific resistance value of $2.8 \times 10^{-6}$ $\Omega \cdot cm$. Therefore, in order to satisfy a sheet resistance value of more than $0\Omega/\square$ and $2\Omega/\square$ or less, and preferably more than $0\Omega/\square$ and $0.7\Omega/\square$ or less, copper is advantageous in that the thickness of the conductive layer may be smaller than that of a conductive layer comprising Al. The sheet resistance may be adjusted depending on the thickness of the conductive layer. For example, in order for the sheet resistance to satisfy a value from $0.6\Omega/\square$ to $0.7\Omega/\square$, a conductive layer comprising Al needs to be formed to have a thickness from 80 nm to 90 nm, but a conductive layer comprising Cu needs to be formed to have a thickness from 55 nm to 65 nm, and thus is economical because the thickness of the layer may be smaller. In addition, Cu has a better yield by approximately 2.5 times Al in the sputtering process, and thus it is possible to expect an improvement in deposition rate theoretically by 4 to 5 times. Accordingly, the conductive layer comprising Cu has high efficiency and is economical in the production process, and thus has an excellent advantage.

In an exemplary embodiment of the present application, the thickness of the intermediate layer may be 5 nm to 50 nm. When the thickness of the intermediate layer is 5 nm or more in consideration of an etching property, it may be relatively easy to adjust the process, and when the thickness is 50 nm or less, the thickness may be relatively advantageous in terms of a production rate.

When the intermediate layer comprises an oxide of copper, the thickness of the intermediate layer may be specifically 8 nm to 30 nm, and more specifically 15 nm to 25 nm. When the thickness is in a range from 8 nm to 30 nm, there is an effect of primarily lowering a reflectance from 20% to 60% in the reflectance of the conductive layer in a visible light wavelength region of 600 nm or more, and thus there is an effect that allows a reflectance of a conductive structure body comprising a conductive layer, an intermediate layer, and a darkening layer to be lowered evenly to 20% or less in the entire wavelength region of visible light from 300 nm to 800 nm. Furthermore, when the thickness is in a range from 15 nm to 25 nm, there is a further excellent effect of primarily lowering a reflectance from 50% to 60% in the reflectance of the conductive layer in a visible light wavelength region of 600 nm or more, and thus there is an effect that allows a reflectance of a conductive structure body comprising a conductive layer, an intermediate layer, and a darkening layer to be lowered evenly to 15% or less in the entire wavelength region of visible light from 300 nm to 800 nm.

When the intermediate layer comprises an oxynitride of aluminum, a thickness of the intermediate layer may be specifically 10 nm to 40 nm, and more specifically 20 nm to 30 nm. When the thickness is in a range from 10 nm to 40 nm, there is an effect of primarily lowering a reflectance from 10% to 40% in the reflectance of the conductive layer in a visible light wavelength region of 500 nm or less, and thus there is an effect that allows a reflectance of a conductive structure body comprising a conductive layer, an intermediate layer, and a darkening layer to be lowered evenly to 20% or less in the entire wavelength region of visible light from 300 nm to 800 nm. Further, when the thickness is in a range from 20 nm to 30 nm, there is a further excellent effect of primarily lowering a reflectance from 30% to 40% in the reflectance of the conductive layer in a visible light wavelength region of 500 nm or less, and thus there is an effect that allows a reflectance of a conductive structure body comprising a conductive layer, an intermediate layer, and a darkening layer to be further lowered in the entire wavelength region of visible light from 300 nm to 800 nm.

In an exemplary embodiment of the present application, the thickness of the darkening layer may be 20 nm to 150 nm. The thickness may be specifically 20 nm to 100 nm, more specifically 40 nm to 80 nm, or 40 nm to 60 nm. A preferred thickness of the darkening layer may vary according to the refractive index of the used material and a manufacturing process, but in consideration of an etching property, when the thickness is 20 nm or more, it may be relatively easy to adjust the process, and when the thickness is 150 nm or less, the thickness may be relatively advantageous in terms of a production rate. It is easy to adjust the process and the production rate is improved within the aforementioned thickness range, and thus the aforementioned thickness range may be more advantageous in the manufacturing process. Within a range from 20 nm to 100 nm, the average reflectance may be 15% to 20% or less in the entire wavelength region of visible light from 300 nm to 800 nm. Within a range from 40 nm to 80 nm or from 40 nm to 60 nm, the average reflectance may be 10% to 15% or less in the entire wavelength region of visible light from 300 nm to 800 nm, and thus the aforementioned range is more advantageous in forming the darkening layer.

In an exemplary embodiment of the present application, the thickness of the conductive layer is not particularly limited, but a better effect may be exhibited in terms of electric conductivity of the conductive layer and economic efficiency of a process of forming a pattern when the thickness is 0.01 μm to 10 μm.

In an exemplary embodiment of the present application, the darkening layer may be provided only on any one surface of the conductive layer, or both surfaces of the conductive layer with an intermediate layer therebetween. Here, the darkening layer may have a pattern having the same shape as the conductive layer. However, the pattern size of the patterned darkening layer need not be completely the same as that of the patterned conductive layer, and even the case where the line width of the patterned darkening layer is smaller or larger than that of the patterned conductive layer is comprised in the scope of the present application. Specifically, the line width of the pattern in the patterned darkening layer may be 80% to 120% of the line width of the pattern in the patterned conductive layer.

In an exemplary embodiment of the present application, the patterned darkening layer may have a pattern shape having the line width that is smaller or larger than that of the patterned conductive layer. For example, the area of the patterned darkening layer may be 80% to 120% of an area occupied by the patterned conductive layer.

In the exemplary embodiment of the present application, it is preferable that the pattern of the darkening layer be a pattern shape having the line width that is the same as or larger than that of the pattern of the conductive layer.

In the case where the patterned darkening layer has the pattern shape having the larger line width than that of the patterned conductive layer, since an effect in which the patterned darkening layer covers the patterned conductive layer when observed by the user may be more largely increased, there is an advantage in that an effect by gloss or reflection of the patterned conductive layer may be efficiently blocked. However, even though the line width of the pattern in the patterned darkening layer is the same as that of the pattern in the patterned conductive layer, a target effect of the present application can be accomplished.

The intermediate layer may have a pattern having the same shape as the conductive layer. However, the pattern size of the patterned intermediate layer need not be completely the same as that of the patterned conductive layer, and even the case where the line width of the patterned intermediate layer is smaller or larger than that of the patterned conductive layer is comprised in the scope of the present application. Specifically, the line width of the pattern in the patterned intermediate layer may be 80% to 120% of the line width of the pattern in the patterned conductive layer.

In the exemplary embodiment of the present application, the patterned intermediate layer may have a pattern shape having the line width that is smaller or larger than that of the patterned conductive layer. For example, the area of the patterned intermediate layer may be 80% to 120% of an area occupied by the patterned conductive layer.

In the exemplary embodiment of the present application, it is preferable that the pattern of the intermediate layer be a pattern shape having the line width that is the same as or larger than that of the pattern of the conductive layer.

In the case where the patterned intermediate layer has the pattern shape having the larger line width than that of the patterned conductive layer, since an effect in which the patterned intermediate layer covers the patterned conductive layer when observed by the user may be more largely increased, there is an advantage in that an effect by gloss or reflection of the patterned conductive layer may be efficiently blocked. However, even though the line width of the pattern in the patterned intermediate layer is the same as that of the pattern in the patterned conductive layer, a target effect of the present application can be accomplished.

In the conductive structure body according to the exemplary embodiment of the present application, a transparent board may be used as the substrate, but the substrate is not particularly limited, and for example, glass, a plastic board, a plastic film, and the like may be used.

In the exemplary embodiment of the present application, the line width of the patterned conductive layer may be more than 0 µm and 10 µm or less, specifically 0.1 µm or more and 10 µm or less, more specifically 0.2 µm or more to 8 µm or less, and even more specifically 0.5 µm or more to 5 µm or less.

In the exemplary embodiment of the present application, the opening ratio of the patterned conductive layer, that is, the ratio of the area not covered by the pattern, may be 70% or more, 85% or more, and 95% or more. In addition, the opening ratio of the patterned conductive layer may be 90% to 99.9%, but is not limited thereto.

In the exemplary embodiment of the present application, the pattern of the patterned conductive layer may be a regular pattern or an irregular pattern.

A pattern shape of the art, such as a mesh pattern, may be used as the regular pattern. The irregular pattern is not particularly limited, but may be a boundary line shape of figures constituting a Voronoi diagram. In the present application, in the case where the irregular pattern and the patterned darkening layer are used together, a diffracted pattern of reflected light by lighting having directivity may be removed by the irregular pattern, and an effect of scattering light may be minimized by the patterned darkening layer, such that the problem in visibility may be minimized.

Examples of the conductive structure body according to the exemplary embodiment of the present application are illustrated in the following FIGS. 1 to 3. FIGS. 1 to 3 illustrate the order of lamination of the substrate, the conductive layer, and the darkening layer, and the conductive layer and the darkening layer may not have an entire surface layer form but have a pattern shape when being applied as a fine transparent electrode such as a touch screen panel in practice.

According to FIG. 1, the case where a substrate 100, a darkening layer 200, an intermediate layer 400, and a conductive layer 300 are disposed in this order is illustrated. When a user looks at a touch screen panel at the substrate side, the reflectance by the conductive layer may be greatly reduced.

According to FIG. 2, the case where the substrate 100, the conductive layer 300, the intermediate layer 400, and the darkening layer 200 are disposed in this order is illustrated. When a user looks at a touch screen panel from a surface opposite to the substrate side, the reflectance by the conductive layer may be greatly reduced.

According to FIG. 3, the case where the darkening layers 200 and 220 are disposed between the substrate 100 and the conductive layer 300 and on the conductive layer 300, and the case where the intermediate layers 400 and 420 are disposed between the darkening layer and the conductive layer are illustrated. When a user looks at a touch screen panel both from the substrate side and from a side opposite thereto, all of the reflectances by the conductive layer may be greatly reduced.

In the description of FIGS. 1 to 3, the conductive layer may be a patterned conductive layer, the darkening layer may be a patterned darkening layer, and the intermediate layer may be a patterned intermediate layer.

The conductive structure body according to an exemplary embodiment of the present application may have a structure in which the darkening layer is provided on at least one surface of the conductive layer.

The structure of the conductive structure body according to an exemplary embodiment of the present application may be a structure in which the substrate, the darkening layer, the conductive layer, and the darkening layer are sequentially laminated. In addition, the conductive structure body may comprise an additional conductive layer and an additional darkening layer on the darkening layer at the outermost portion. At least one intermediate layer may be additionally comprised in this configuration. The intermediate layer in the examples of the following structure may have one layer, and two or more layers.

That is, the structure of the conductive structure body according to an exemplary embodiment of the present application may be a structure of substrate/darkening layer/intermediate layer/conductive layer, a structure of substrate/conductive layer/intermediate layer/darkening layer, a structure of substrate/darkening layer/intermediate layer/conductive layer/intermediate layer/darkening layer, a structure of substrate/conductive layer/intermediate layer/darkening layer/intermediate layer/conductive layer, a structure of substrate/darkening layer/intermediate layer/conductive layer/intermediate layer/darkening layer/intermediate layer/conductive layer/intermediate layer/darkening layer, a structure of substrate/darkening layer/intermediate layer/conductive layer/intermediate layer/darkening layer/intermediate layer/conductive layer/intermediate layer/darkening layer/intermediate layer/conductive layer/intermediate layer/darkening layer, and the like. In the structure, the intermediate layer may comprise the case where the intermediate layer has one layer, and the case where the intermediate layer has two or more layers. For example, the case of a structure of substrate/darkening layer/intermediate layer/conductive layer may also comprise a structure of substrate/darkening layer/first intermediate layer/second intermediate layer/conductive layer, a structure of substrate/darkening layer/first intermediate layer/second intermediate layer/third intermediate layer/conductive layer, and the like.

In the aforementioned description, the conductive layer may be a patterned conductive layer, the darkening layer may be a patterned darkening layer, and the intermediate layer may be a patterned intermediate layer.

A method for manufacturing a conductive structure body according to an exemplary embodiment of the present application may comprise: forming at least one intermediate layer on a conductive layer; forming a darkening layer on the intermediate layer; and laminating the conductive layer or the darkening layer and a substrate. The manufacturing method may further comprise separately or simultaneously patterning the conductive layer and the darkening layer.

A method for manufacturing a conductive structure body according to an exemplary embodiment of the present application may comprise: forming a conductive layer on a substrate; forming at least one intermediate layer on the conductive layer; and forming a darkening layer on the intermediate layer. The manufacturing method may further comprise separately or simultaneously patterning the conductive layer, the intermediate layer, and the darkening layer. Specifically, the conductive layer may be patterned after the conductive layer is formed, the intermediate layer may be patterned after the intermediate layer is formed, and the darkening layer may be patterned after the darkening layer is formed. Furthermore, the conductive layer, the intermediate layer, and the darkening layer may also be simultaneously patterned after the forming of the darkening layer.

A method for manufacturing a conductive structure body according to an exemplary embodiment of the present application may comprise: forming a darkening layer on a substrate; forming at least one intermediate layer on the darkening layer; and forming a conductive layer on the intermediate layer. The manufacturing method may further comprise separately or simultaneously patterning the darkening layer, the intermediate layer, and the conductive layer. Specifically, the darkening layer may be patterned after the darkening layer is formed, the intermediate layer may be patterned after the intermediate layer is formed, and the conductive layer may be patterned after the conductive layer is formed. Further, specifically, the conductive layer, the intermediate layer, and the darkening layer may also be simultaneously patterned after the forming of the conductive layer.

In an exemplary embodiment of the present application, the method for manufacturing a conductive structure body may comprise: forming a darkening layer on a substrate; forming at least one intermediate layer on the darkening layer; forming a conductive layer on the intermediate layer; forming at least one intermediate layer on the conductive layer; and forming a darkening layer on the intermediate layer. The manufacturing method may further comprise separately or simultaneously patterning the darkening layer, the intermediate layer, and the conductive layer.

In the method for manufacturing the conductive structure body, the surface resistance of the intermediate layer, the conductive layer or the darkening layer before patterning may be more than 0 Ω/square and 2 Ω/square or less, and preferably more than 0 Ω/square and 0.7 Ω/square or less. If the surface resistance is 2 Ω/square or less, and particularly 0.7 Ω/square or less, designing of fine patterning and a manufacturing process are easily performed as the surface resistance of the conductive layer or the darkening layer before patterning is decreased, and there is an effect that a response speed of the electrode is increased by decreasing the surface resistance of the conductive structure body after patterning.

A method for manufacturing a conductive structure body according to an exemplary embodiment of the present application may comprise: forming a patterned conductive layer on a substrate; forming at least one patterned intermediate layer on the patterned conductive layer; and forming a patterned darkening layer on the patterned intermediate layer.

A method for manufacturing a conductive structure body according to an exemplary embodiment of the present application may comprise: forming a patterned darkening layer on a substrate; forming at least one patterned intermediate layer on the patterned darkening layer; and forming a patterned conductive layer on the patterned intermediate layer.

In an exemplary embodiment of the present application, the method for manufacturing a conductive structure body may comprise: forming a patterned darkening layer on a substrate; forming at least one patterned intermediate layer on the patterned darkening layer; forming a patterned conductive layer on the patterned intermediate layer; forming at least one patterned intermediate layer on the patterned conductive layer; and forming a patterned darkening layer on the patterned intermediate layer.

In the method for manufacturing a conductive structure body, the description of the conductive structure body, the conductive layer, the intermediate layer, and the darkening layer is the same as described above.

In an exemplary embodiment of the present application, in the forming of the patterned intermediate layer, the forming of the intermediate layer, the forming of the patterned darkening layer, or the forming of the darkening layer, a method known in the art may be used in forming the patterned intermediate layer, the intermediate layer, the patterned darkening layer, or the darkening layer. For example, the layers may be formed by a method, such as deposition, sputtering, wet coating, evaporation, electrolytic plating or electroless plating, and lamination of a metal foil, and may be specifically formed by a sputtering method.

For example, as in $AlO_xN_y$ (x and y are each a ratio of the numbers of O and N atoms to one atom of Al) during the formation of the intermediate layer and the darkening layer, when a reactive sputtering method is used by using an Al metal target, the process may be performed by adjusting partial pressure of a reactive gas such as $O_2$ and/or $N_2$.

For example, in a case where the conductive layer comprising Cu, the intermediate layer comprising $CuO_x$ (x is a ratio of the number of O atoms to one atom of Cu) which is an oxide of copper, and the darkening layer are formed, when an inert gas, for example, a gas such as Ar is used as a sputtering gas, there is an advantage obtained by using an oxide single material sputtering target of copper. Since the oxide single material target of copper is used, it is not necessary to adjust partial pressure of the reactive gas, and thus there is an advantage in that it is relatively easy to adjust the process and it is possible to perform a bulk etching by using a Cu etchant even in the formation of a final conductive structure body. Furthermore, even in the case where the conductive layer comprising Cu, the intermediate layer comprising an oxide of copper, and the darkening layer are formed, when a reactive sputtering method is used by using a Cu metal target, the process may also be performed by adjusting partial pressure of a reactive gas such as $O_2$.

In the exemplary embodiment of the present application, the method for forming the patterned conductive layer is not particularly limited, and the patterned conductive layer may be directly formed by a printing method, or a method for patterning the conductive layer after the conductive layer is formed may be used.

In the exemplary embodiment of the present application, in the case where the patterned conductive layer is formed by using the printing method, ink or paste of the conductive material may be used, and the paste may further comprise a binder resin, a solvent, a glass frit, or the like in addition to the conductive material.

In the case where the conductive layer is patterned after the conductive layer is formed, a material having an etching resist property may be used.

In the exemplary embodiment of the present application, the conductive layer may be formed by a method such as evaporation, sputtering, wet coating, vaporization, electrolytic plating, electroless plating, and lamination of metal foils. A method for applying organic metal, nano metal, or a complex solution thereof on the substrate and then providing conductivity by firing and/or drying may be used as the method for forming the conductive layer. Organic silver may be used as the organic metal, and nano silver particles may be used as the nano metal.

In the exemplary embodiment of the present application, the patterning of the conductive layer may be performed by using a method using an etching resist pattern. The etching resist pattern may be formed by using a printing method, a photolithography method, a photography method, a method using a mask, or laser transferring, for example, thermal transfer imaging, and the printing method or photolithography method is more preferable, but the method is not limited thereto. The conductive thin film layer may be etched and patterned by using the etching resist pattern, and the etching resist pattern may be easily removed by a strip process.

The exemplary embodiment of the present application provides a touch screen panel comprising the conductive structure body. For example, the conductive structure body according to the exemplary embodiment of the present application may be used as a touch-sensitive type electrode board in a capacitance type touch screen panel.

The exemplary embodiment of the present application provides a display device comprising the touch screen panel.

The touch screen panel according to the exemplary embodiment of the present application may further comprise an additional structure body in addition to the aforementioned conductive structure body comprising the substrate, the patterned conductive layer, and the patterned darkening layer. In this case, two structure bodies may be disposed in the same direction, or two structure bodies may be disposed in directions that are opposite to each other. Two or more structure bodies that may be comprised in the touch screen panel according to the exemplary embodiment of the present application do not need to have the same structure, and only any one and preferably the structure body that is closest to the user may comprise the substrate, the patterned conductive layer, and the patterned darkening layer, and the additional structure body may not comprise the patterned darkening layer. In addition, layer laminate structures in two or more structure bodies may be different from each other. In the case where two or more structure bodies are comprised, an insulation layer may be interposed therebetween. In this case, the insulation layer may further have a function of an adhesive layer.

The touch screen panel according to the exemplary embodiment of the present application may comprise a lower substrate; an upper substrate; and an electrode layer provided on any one surface of a surface of the lower substrate that is in contact with the upper substrate and a surface of the upper substrate that is in contact with the lower substrate or both the surfaces. The electrode layer may have X axis and Y axis position detection functions.

In this case, one or two of the electrode layer provided on the lower substrate and the surface of the lower substrate that is in contact with the upper substrate; and the electrode layer provided on the upper substrate and the surface of the upper substrate that is in contact with the lower substrate may be the conductive structure body according to the exemplary embodiment of the present application. In the case where only any one of the electrode layers is the conductive structure body according to the exemplary embodiment of the present application, the other one may have the conductive pattern known in the art.

In the case where the electrode layer is provided on one surface of each of both the upper substrate and the lower substrate to form a double-layered electrode layer, an insulation layer or a spacer may be provided between the lower substrate and the upper substrate so as to constantly maintain an interval between the electrode layers and prevent connection therebetween. The insulation layer may comprise an adhesive or a UV or heat curable resin. The touch screen panel may further comprise a ground portion connected to the pattern of the conductive layer of the aforementioned conductive structure bodies. For example, the ground portion may be formed at an edge portion of the surface on which the pattern of the conductive layer of the substrate is formed. Further, at least one of an antireflection film, a polarizing film, and a fingerprint resistant film may be provided on at least one surface of the laminate comprising the conductive structure body. Other kinds of functional films may be further comprised in addition to the aforementioned functional films according to the design specification. The touch screen panel may be applied to display devices such as an OLED display panel, a liquid crystal display (LCD), a cathode-ray tube (CRT), and a PDP.

In the touch screen panel according to the exemplary embodiment of the present application, the patterned conductive layer and the patterned darkening layer may be provided on both surfaces of the substrate, respectively.

The touch screen panel according to the exemplary embodiment of the present application may further comprise an electrode portion or a pad portion on the conductive structure body. In this case, the effective screen portion, the electrode portion, and the pad portion may be formed of the same conductor.

In the touch screen panel according to the exemplary embodiment of the present application, the patterned darkening layer may be provided at a side observed by a user.

The exemplary embodiment of the present application provides a display device comprising the conductive structure body. In the display device, the conductive structure body according to the exemplary embodiment of the present application may be used in a color filter board, a thin film transistor board, or the like.

The exemplary embodiment of the present application provides a solar battery comprising the conductive structure body. Examples of the solar battery may comprise an anode electrode, a cathode electrode, a photokinesis layer, a hole transport layer and/or an electron transport layer, and the conductive structure body according to the exemplary embodiment of the present application may be used as the anode electrode and/or the cathode electrode.

The conductive structure body may be used instead of known ITO in the display device or the solar battery, and may be used to provide flexibility. In addition, the conductive structure body may be used as a next generation transparent electrode in conjunction with CNT, conductive polymers, graphene and the like.

Hereinafter, the present application will be described in detail with reference to the Examples. However, the following Examples are set forth to illustrate the present application, but the range of the present application is not limited thereto.

Experimental Example 1

An intermediate layer was deposited on a Cu electrode having a thickness of 100 nm as a conductive layer by varying the thickness of $CuO_x$ (0<x, atomic percent ratio of Cu and O was 95:5 by a reactive sputtering method, and then the sheet resistance on the surface of the intermediate layer was measured. The sheet resistance value at this time is shown in the following Table 1.

TABLE 1

| Thickness of intermediate layer (nm) | Sheet resistance measured on surface of intermediate layer of electrode comprising intermediate layer (Ω/□) |
|---|---|
| 0 | 0.227 |
| 8 | 0.229 |
| 15 | 0.221 |
| 20 | 0.218 |
| 25 | 0.217 |

Referring to Table 1, it could be confirmed that there was no difference between the sheet resistance value of the copper electrode as a conductive layer and the sheet resistance value on the surface of the intermediate layer after the intermediate layer was deposited, and thus the intermediate layer did not impair the sheet resistance value of the lower electrode.

Further, the reflectance at the visible light region wavelength according to the thickness of the intermediate layer is illustrated in FIG. 4.

Experimental Example 2

An intermediate layer was deposited on an Al electrode having a thickness of 80 nm as a conductive layer by varying the thickness of $AlO_xN_y$ (0<x, 0.3≤y<1) by a reactive sputtering method. The reflectance at the visible light region wavelength from 300 nm to 800 nm according to the thickness of the intermediate layer is illustrated in FIG. 5. It could be confirmed that the reflectance was decreased at a wavelength in a short wavelength region of 500 nm or less comprising the intermediate layer.

Examples 1 to 4

A conductive structure body was manufactured by depositing an intermediate layer formed of $CuO_x$ (0<x, the atomic percent ratio of Cu and O was 95:5) having a thickness of 15 nm on a Cu electrode having a thickness of 100 nm as a conductive layer by a reactive sputtering method, and then depositing a darkening layer formed of $CuO_x$ (0<x, the atomic percent ratio of Cu and O was 60:40) to have a thickness of 43 nm (Example 1), 54 nm (Example 2), 65 nm (Example 3), and 75 nm (Example 4) on the intermediate layer. The reflectances at a visible light region wavelength in Examples 1 to 4 were measured, and are illustrated in FIG. 6. Referring to FIG. 6, it could be confirmed that in Examples 1 to 4, the average reflectance in the entire wavelength region of visible light from 300 nm to 800 nm was 20% or less.

Examples 5 and 6

A conductive structure body was manufactured by depositing an intermediate layer formed of $CuO_x$ (0<x, the atomic percent ratio of Cu and O was 95:5) on a Cu electrode having a thickness of 100 nm as a conductive layer by varying the thickness into 8 nm (Example 5) and 25 nm (Example 6) by a reactive sputtering method, and then depositing a darkening layer formed of $CuO_x$ (0<x, the atomic percent ratio of Cu and O was 60:40) to have a thickness of 65 nm on the intermediate layer. The reflectances at a visible light region wavelength in Examples 5 and 6 were measured, and are illustrated along with those of Example 4 and Comparative Example 1 in FIG. 7. Referring to FIG. 7, it could be confirmed that in Examples 5 and 6, the average reflectance in the entire wavelength region of visible light from 300 nm to 800 nm was 20% or less. When Comparative Example 1 was compared to Examples 4 to 6, it could be confirmed that the reflectance of a conductive structure body comprising an intermediate layer in a long wavelength region of 600 nm or more was significantly decreased.

Comparative Examples 1 to 4

A conductive structure body was manufactured by depositing a darkening layer formed of $CuO_x$ (0<x, the atomic percent ratio of Cu and O was 60:40) on a Cu electrode having a thickness of 100 nm as a conductive layer by varying the thickness into 65 nm (Comparative Example 1), 43 nm (Comparative Example 2), 54 nm (Comparative Example 3), and 75 nm (Comparative Example 4) by a reactive sputtering method. The reflectances at a visible light region wavelength in Comparative Examples 1 to 4 were measured, and are illustrated in FIG. 8.

Example 7

A conductive structure body of Example 7 was manufactured by laminating the conductive structure body of Example 3 and a glass substrate using an optical clear adhesive (OCA). The reflectances of Examples 3 and 7 at a visible light region wavelength are illustrated in FIG. 9.

Referring to FIG. 9, the reflectance in a region of a red color, which is a long wavelength, is slightly increased after the lamination, but the reflectance in a region at a wavelength of 600 nm or less is slightly decreased, and thus a reflectance of approximately 10% on average was confirmed. Therefore, when the conductive structure body is applied to a touch screen panel, a display device, a solar cell, and the like, excellent visibility may be obtained.

Comparative Example 5

A conductive structure body of Comparative Example 5 was manufactured by laminating the conductive structure body of Comparative Example 1 and a glass substrate using an optical clear adhesive (OCA). The reflectances of Comparative Examples 1 and 5 at a visible light region wavelength are illustrated in FIG. 10.

Referring to FIG. 10, after the substrate was laminated, the intensity of the spectrum was decreased in a region of a blue color which is a short wavelength, and the intensity of the spectrum was increased in a region of a red color which is a long wavelength, and as a result, a sample showing a red color was observed.

Experimental Example 3

Analysis of Element Component Ratio According to Etching Time

The following Table 2 is a composition ratio depth profile of a darkening layer, an intermediate layer, and a Cu electrode layer as a conductive layer, which was measured by an X-ray Photoelectron Spectroscopy (XPS), indicating the atomic percent component ratio of each layer according to the etching time. Referring to the following Table 2, it can be confirmed that the atomic percent ratio of copper:oxygen in the darkening layer is 60:39 to 94:6, and the atomic percent ratio of copper:oxygen in the intermediate layer is 95:5 to 97:3. In addition, FIG. 11 illustrates the atomic percent according to the darkening layer, the intermediate layer, and the conductive layer.

TABLE 2

| Layer type | Etching time(s) | Cu | O | C |
|---|---|---|---|---|
| Darkening layer | 0 | 33.6 | 42.5 | 23.9 |
|  | 10 | 60.4 | 38.2 | 1.5 |
|  | 20 | 61 | 37.7 | 1.4 |
|  | 40 | 61 | 37.8 | 1.2 |
|  | 80 | 61.4 | 37.7 | 0.9 |
|  | 120 | 61.6 | 37.6 | 0.8 |
|  | 160 | 61.6 | 37.5 | 1 |
|  | 210 | 61.6 | 37.2 | 1.1 |
|  | 260 | 61.3 | 37.9 | 0.8 |
|  | 310 | 62 | 37 | 1.1 |
|  | 360 | 63.9 | 35.3 | 0.8 |
|  | 410 | 71.3 | 27.9 | 0.8 |
|  | 460 | 83 | 16.8 | 0.2 |
|  | 510 | 93.8 | 6.2 | 0 |
| Intermediate layer | 560 | 95.3 | 4.7 | 0 |
|  | 610 | 94.1 | 5.9 | 0 |
|  | 660 | 97 | 3 | 0 |
| Conductive layer | 710 | 98.9 | 1.1 | 0 |
|  | 760 | 98.9 | 0.2 | 0 |
|  | 810 | 100 | 0 | 0 |

Examples 8 to 12

A conductive structure body was manufactured by depositing an intermediate layer formed of $AlO_xN_y$ ($0<x$, $0<y<0.3$) having a thickness of 30 nm on an Al electrode having a thickness of 80 nm as a conductive layer by a reactive sputtering method, and then depositing a darkening layer formed of $AlO_xN_y$ ($0<x$, $0.3 \leq y<1$) to have a thickness of 40 nm (Example 8), 50 nm (Example 9), 60 nm (Example 10), 70 nm (Example 11), and 80 nm (Example 12) on the intermediate layer.

The reflectances at a visible light region wavelength in Examples 8 to 12 were measured, and are illustrated in FIG. 12. Referring to FIG. 12, it could be confirmed that in Examples 8 to 12, the average reflectance in the entire wavelength region of visible light from 300 nm to 800 nm was 20% or less, and that in Examples 8 to 10, the average reflectance in the entire wavelength region of visible light from 300 nm to 800 nm was 10% or less.

Therefore, it should be understood that the above embodiments are not limitative, but illustrative in all aspects. The range of the invention is defined by the appended claims rather than by the description preceding them, and therefore all changes and modifications that fall within metes and bounds of the claims, or equivalents of such metes and bounds are therefore intended to be embraced by the claims.

DESCRIPTION OF REFERENCE NUMERALS

100: Substrate
200, 220: Darkening layer
300: Conductive layer
400, 420: Intermediate layer

The invention claimed is:

1. A conductive structure body comprising:
a substrate;
a conductive layer;
at least one intermediate layer; and
a darkening layer,
wherein the conductive layer comprises copper, the intermediate layer and the darkening layer comprise an oxide of copper, and an atomic percent of copper in a total composition of the intermediate layer is 1.01 times to 1.62 times that of copper in a total composition of the darkening layer, or wherein the conductive layer comprises aluminum, the intermediate layer comprises an oxynitride of aluminum in which an atomic percent of nitrogen in a total composition is more than 0% and less than 20%, and the darkening layer comprises an oxynitride of aluminum in which an atomic percent of nitrogen in a total composition is 20% or more and 45% or less.

2. The conductive structure body of claim 1, wherein the conductive layer is provided between the substrate and the darkening layer, and the at least one intermediate layer is provided between the conductive layer and the darkening layer.

3. The conductive structure body of claim 1, wherein the darkening layer is provided between the substrate and the conductive layer, and the at least one intermediate layer is provided between the conductive layer and the darkening layer.

4. The conductive structure body of claim 1, wherein a total reflectance of the conductive structure body is 20% or less.

5. The conductive structure body of claim 1, wherein an extinction coefficient k of the darkening layer is 0.2 or more and 2.5 or less.

6. The conductive structure body of claim 1, wherein the conductive layer comprises one or more materials selected from the group consisting of a metal, a metal alloy, a metal oxide, and a metal nitride, and the material has a specific resistance from $1 \times 10^{-6}$ Ω·cm to $30 \times 10^{-6}$ Ω·cm.

7. The conductive structure body of claim 1, wherein the darkening layer, the intermediate layer, and the conductive layer comprise the same metal.

8. The conductive structure body of claim 1, wherein the conductive layer comprises copper, the intermediate layer comprises an oxide of copper in which an atomic percent ratio of copper:oxygen is 95:5 to 97:3, and the darkening layer comprises an oxide of copper in which an atomic percent ratio of copper:oxygen is 60:39 to 94:6.

9. The conductive structure body of claim 1, wherein the conductive layer comprises copper, the intermediate layer and the darkening layer comprise an oxide of copper, and the intermediate layer has a gradient in which an atomic percent of copper in a total composition of the intermediate layer is decreased as the intermediate layer is adjacent to the darkening layer in a thickness direction, an average atomic percent ratio of copper:oxygen in the intermediate layer is 95:5 to 97:3, and an atomic percent ratio of copper:oxygen in the darkening layer is 60:39 to 94:6.

10. The conductive structure body of claim 1, wherein a thickness of the intermediate layer is 5 nm to 50 nm.

11. The conductive structure body of claim 1, wherein a thickness of the darkening layer is 20 nm to 150 nm.

12. The conductive structure body of claim 1, wherein a thickness of the conductive layer is 0.01 μm to 10 μm.

13. The conductive structure body of claim 1, wherein the darkening layer is provided on at least one surface of the conductive layer.

14. The conductive structure body of claim 1, wherein the conductive layer, the intermediate layer, or the darkening layer is patterned.

15. The conductive structure body of claim 1, wherein the conductive layer, the intermediate layer, and the darkening layer are patterned, and a line width of a pattern in the patterned conductive layer is 10 μm or less.

16. A touch screen panel comprising the conductive structure body of claim 1.

17. A display device comprising the conductive structure body of claim 1.

18. A solar cell comprising the conductive structure body of claim 1.

19. A method for manufacturing a conductive structure body, the method comprising:
forming at least one intermediate layer on a conductive layer;
forming a darkening layer on the intermediate layer; and
laminating the conductive layer or the darkening layer and a substrate,
wherein the conductive layer comprises copper, the intermediate layer and the darkening layer comprise an oxide of copper, and an atomic percent of copper in a total composition of the intermediate layer is 1.01 times to 1.62 times that of copper in a total composition of the darkening layer, or
wherein the conductive layer comprises aluminum, the intermediate layer comprises an oxynitride of aluminum in which an atomic percent of nitrogen in a total composition is more than 0% and less than 20%, and the darkening layer comprises an oxynitride of aluminum in which an atomic percent of nitrogen in a total composition is 20% or more and 45% or less.

20. A method for manufacturing a conductive structure body, the method comprising:
forming a conductive layer on a substrate;
forming at least one intermediate layer on the conductive layer; and
forming a darkening layer on the intermediate layer,
wherein the conductive layer comprises copper, the intermediate layer and the darkening layer comprise an oxide of copper, and an atomic percent of copper in a total composition of the intermediate layer is 1.01 times to 1.62 times that of copper in a total composition of the darkening layer, or
wherein the conductive layer comprises aluminum, the intermediate layer comprises an oxynitride of aluminum in which an atomic percent of nitrogen in a total composition is more than 0% and less than 20%, and the darkening layer comprises an oxynitride of aluminum in which an atomic percent of nitrogen in a total composition is 20% or more and 45% or less.

21. The method of claim 19, further comprising: separately or simultaneously patterning the conductive layer, the intermediate layer, and the darkening layer.

22. A method for manufacturing a conductive structure body, the method comprising:
forming a patterned conductive layer on a substrate;
forming at least one patterned intermediate layer on the patterned conductive layer; and
forming a patterned darkening layer on the patterned intermediate layer,
wherein the conductive layer comprises copper, the intermediate layer and the darkening layer comprise an oxide of copper, and an atomic percent of copper in a total composition of the intermediate layer is 1.01 times to 1.62 times that of copper in a total composition of the darkening layer, or
wherein the conductive layer comprises aluminum, the intermediate layer comprises an oxynitride of aluminum in which an atomic percent of nitrogen in a total composition is more than 0% and less than 20%, and the darkening layer comprises an oxynitride of aluminum in which an atomic percent of nitrogen in a total composition is 20% or more and 45% or less.

\* \* \* \* \*